United States Patent Office 3,763,217
Patented Oct. 2, 1973

3,763,217
PREPARATION OF CARBAMATES
William F. Brill, Skillman, N.J., assignor to
Halcon International, Inc.
No Drawing. Filed Dec. 3, 1970, Ser. No. 94,969
Int. Cl. C07c *125/06*
U.S. Cl. 260—471 C                    8 Claims

ABSTRACT OF THE DISCLOSURE

N-substituted carbamates are prepared by reacting an organic carbonate with a primary or secondary amine in the presence of a Lewis acid.

---

This invention relates to the preparation of carbamates and is more particularly concerned with a method for producing alkyl N-aryl carbamates.

Carbamates are a well-known class of compounds which can be produced by various methods, for example by the reaction of isocyanates with alcohols or by the reaction of an amine and an alcohol with phosgene. Since, however, carbamates are convertible to isocyanates, e.g. under the influence of heat, and thus can be employed to produce compounds which can be used in the manufacture of polyurethanes, it is desirable that a process be available which makes possible the preparation of carbamates by a synthetic route which does not require the use of an isocyanate as an intermediate. Furthermore, it is desirable to avoid the necessity of using phosgene in view of the serious toxicity problems presented by this compound. Process of this nature have been proposed, but they have tended to be limited with respect to the type of carbamates which can be produced by their use. In particular, such prior proposals have not been entirely satisfactory for the preparation of alkyl N-aryl carbamates.

It is accordingly an object of this invention to provide an improved process for the preparation of N-substituted carbamates.

It is a further object of the invention to provide a process by means of which alkyl N-substituted carbamates can be effectively produced.

It is another object of the invention to provide a process which is particularly suited for the synthesis of alkyl N-aryl carbamates.

In accordance with the invention, carbamates of the character indicated are prepared by a process which does not require the use of phosgene or isocyanates. It has been discovered that the reaction between organic carbonates and amines is catalyzed by Lewis acids and the process of this invention accordingly comprises the use of Lewis acids as catalysts in the preparation of N-substituted carbamates by the reaction of an organic carbonate with a primary or a secondary amine. The Lewis acids appear to have a unique activity in catalyzing this reaction and Lewis acids have been found to be of particular effectiveness in catalyzing the reaction between an aromatic amine and an alkyl carbonate.

It is a feature of the invention that, while good yields of carbamates can be realized by means of the above-identified process, substituted ureas are by-products of the process, apparently produced by the further reaction of the amine with the carbamate, and these substituted ureas are in themselves valuable products and may be converted to the corresponding carbamates by known means, e.g. by treating them with alcohols. Alternatively, such substituted ureas can be converted to isocyanates by appropriate treatment, e.g. heating, in accordance with well-known techniques.

The organic carbonates which may be employed in the process of this invention include the alkyl, aryl or alkyl aryl esters of carbonic acid. The ester group may be alkyl containing up to 12 carbon atoms, preferably lower alkyl, i.e. containing up to 6 carbon atoms, or it may be aryl containing up to 10 carbon atoms, e.g. phenyl, naphthyl or alkyl-substituted phenyl. Typical carbonates which may be used include dimethyl carbonate, diethyl carbonate, dipropyl carbonate, dibutyl carbonate, dioctyl carbonate, methyl ethyl carbonate, methyl butyl carbonate, diphenyl carbonate, methyl phenyl carbonate, ditolyl carbonate, and the like. Organic carbonates can be readily prepared by various known processes and the preparation of the carbonate reactant forms no part of the present invention. The synthesis of symmetrical dialkyl carbonates, for example, is described in U.S. Pat. 3,227,740, methods for preparing carbonates with disparate alkyl radicals are disclosed in U.S. Pat. 3,227,741, and methods for making diaryl carbonates are referred to in U.S. Pat. 3,234,263.

Amines suitable for reaction with the carbonate in the process of this invention are primary and secondary amines, i.e. compounds having one or more primary or secondary amino groups, preferably primary amines, including monoamines, diamines, triamines, etc. Suitable amines include compounds of the general formula R—NH—R', wherein R is an organic radical, e.g. an alkyl group, an aryl group, or an aralkyl group, the alkyl group containing up to 32 carbon atoms, preferably up to 12 carbon atoms, and the aryl or aralkyl groups, which include a benzene or a naphthalene nucleus substituted by alkyl radicals or aryl or aralkyl radicals, preferably containing up to 15 carbon atoms. The alkyl group may be acyclic and of straight chain or branched structure, or it may be alicyclic. The R group may be interrupted by a hetero atom linkage, such as O or S, and may contain one or more primary or secondary amino groups. In the foregoing formula, R' is preferably hydrogen but it may be an alkyl, aryl, or aralkyl group, as defined for R, and may be the same as R or it may be different from R in a given compound. When R and R' are alkyl groups they may be joined together to form a heterocyclic link with the nitrogen atom to which they are attached. R and R' may also be substituted by non-interferring groups such as alkoxy, halo, and amido groups, and the like. One class of amines of the foregoing formula comprises diamines of the formula $H_2N$—A—$NH_2$, where A is an organic radical corresponding to R, e.g. an alkylene, or aralkylene radical, which may include hetero atom linkages. Examples of typical amines which may be used in the process of this invention include methyl amine, n-butyl amine, octyl amine, tetramethylene diamine, hexamethylene diamine, dibutyl amine, aniline, toluidine (o-, m-, or p-), 2,4-xylidine, 3,4-xylidine, 2,5-xylidine, 4-ethylaniline, 3-propylaniline, 1,3-diaminobenzene, 2,4-diaminotoluene, 4,4'-diamino-diphenyl methane, p-chloro aniline, 2,6-diamino toluene, 4,4'-diamino-diphenyl, 2,4, 4'-triamino diphenyl ether, 2,6-diamino naphthalene, 1,5-diamino-2-methylpentane, benzyl amine, phenylethyl amine, piperidine, morpholine, piperazine, glycine, phenylalanine, phenoxyethyl amine, ethoxyethyl amine, 2-methoxy-5-chloroaniline, 2 - amino ethyl ether, 2-amino ethyl sulphide, cyclohexyl amine, and the like. Also included are amino-terminated polymers such as poly-amines, e.g. polymeric compounds produced by condensation polymerization of aliphatic diamines, and the like, suitably containing up to 100 amino groups or more. It will be understood from the foregoing that the amine which is reacted with the carbonate in accordance with the present invention may be of varied form and the amine needs only to be characterized as a primary or secondary amino compound, suitably having no interfering groups such as nitro groups. However, the preferred amino compounds are aromatic amines and the preferred carbonates are the lower alkyl carbonates, particularly dimethyl carbonate.

As indicated above, the process of the present invention is characterized by the use of Lewis acids as catalysts. Lewis acids are well-known compounds and are defined, for example, in "Physical Organic Chemistry" by Jack Hine (1962—McGraw-Hill Company, New York) and in "Friedel-Crafts and Related Reactions" by George A. Olah, volume I (1963—Interscience Publishers, New York). Some examples of Lewis acids include antimony trichloride, aluminum chloride, antimony trifluoride, ferric chloride, antimony pentachloride, niobium pentachloride, tantalum tetrachloride, titanium tetrachloride, boron trifluoride, antimony pentafluoride, stannic fluoride, aluminum bromide, thallium trichloride, uranyl nitrate, uranium tetrachloride, uranium oxides, e.g. $UO_2$, and the like. Additional examples of Lewis acids are found in "Friedel-Crafts and Related Reactions," referred to above, this publication being concerned primarily with Lewis acids of the salt type.

Preferred Lewis acids for use as catalysts in the process of this invention are those which are compounds of metals of Groups III–VIII of the Periodic Table, especially Groups V and VI, particularly the metals having atomic weights above 120. In general, the preferred Lewis acids are salts, e.g. halides, and the Lewis acids which have been found to be of particular utility and suitability are those which are compounds of uranium, including uranyl compounds, i.e. compounds containing the $UO_2^{++}$ radical, especially the salts, e.g. uranium tetrachloride, uranyl chloride, uranyl nitrate, uranyl acetate, and the like.

When the amine and/or the carbonate is normally solid at room temperature, it is desirable that a solvent be employed. Suitable solvents are the usual inert organic compounds used as solvents in organic syntheses, such as aromatic hydrocarbons, e.g. benzene, toluene, xylene, and the like, aliphatic hydrocarbons such as hexane, octane, dodecane, and the like, halogenated aliphatic hydrocarbons, such as 1,1,2-trichloroethane, 1,2,2-trifluoroethane, and the like, halogenated aromatic hydrocarbons, such as monochlorobenzene, dichlorobenzene, trichlorobenzene, and the like, ethers such as dibutyl ether, dioxane, ethylene glycol disoamyl ether, diethyleneglycol diethyl ether, and the like, and similar inert organic solvents. When at least one of the reactants is normally liquid at room temperature, it is generally not necessary to use a solvent, since the liquid reactant can usually serve as a solvent for the solid reactant, although an inert organic solvent may be employed if it is found that it facilitates the handling of the particular reaction medium.

It is a feature of the invention, and one of its advantages, that the reaction between the carbonate and the amine proceeds smoothly at moderately elevated temperatures, e.g. temperatures of 20 to 150° C., and there is no need for high temperatures to be used. Preferably a temperature within the range of 80 to 110° C. is employed. It will be understood, however, that more elevated temperatures can be employed if desired, e.g. temperatures up to 250° C. and above, but temperatures should be below those at which decomposition of a reactant or a reaction product occurs. Pressure is not a parameter of the process and the operation may ordinarily be carried out at atmospheric pressure. However super atmospheric pressures may be employed if desired in cases in which one or more of the reactants is relatively low boiling but, ordinarily, pressures greater than two atmospheres are not necessary.

Although the reaction can be carried out with stoichiometric quantities of the reactants, it is preferred that one of the reactants be in excess and best results are generally observed when the reactant in excess is the carbonate. While the amount of excess reactant may vary, it is preferred that the excess be limited to a maximum of 50 mols, preferably 15 mols, of the reactant in excess per mol of the other reactant.

The amount of Lewis acid catalyst employed can vary, and even very small amounts are effective to catalyze the reaction. However, it is generally desirable to use at least about .005 mol percent of Lewis acid based on the quantity of reactant which is present at most in stoichiometric quantity, i.e. which is not in excess. Since it is generally preferred that the carbonate be in excess, the amount of catalyst is generally based on the quantity of amine charged to the system. The maximum amount of Lewis acid used will generally be determined by economic considerations and as a general rule there is no particular advantage in using amounts greater than 25 mol percent. The optimum amount of catalyst will vary with reaction conditions and with the particular Lewis acid used but ordinarily it is advantageous to use from 0.1 to 10 mol percent of the Lewis acid, preferably 0.5 to 10%.

The reaction between the amine and the carbonate in the presence of Lewis acid, in accordance with the invention, may be carried out in any convenient reaction vessel and, if super atmospheric pressures are to be employed, the vessel is suitably constructed to withstand the maximum pressure to be employed. The reaction is ordinarily conducted by introducing the two reactants and the catalyst into the reaction vessel and then heating the reactant mixture at the desired reaction temperature for a suitable period of time. The reaction may vary over a wide range, e.g. 0.1 to 48 hours, and the time of the reaction is not a critical aspect of the process, although long reaction times tend to favor the formation of the substituted urea at the expense of the carbamate. Ordinarily, reaction times longer than 1 hour are more preferred but there is generally no advantage, from the standpoint of carbamate formation, in reaction times greater than 24 hours. The reaction may be carried out batch-wise or it may be carried out continuously. Indeed, one of the features of the process is that it lends itself to continuous operation by reason of the fact that all of the reactants in the appropriate proportions can be introduced together into the system.

The reaction between the carbonate and the amine in accordance with the invention results in the concurrent release of the alcohol corresponding to the carbonate ester group and, since the presence of such alcohol generally tends to inhibit the reaction, it is preferred that the released alcohol be removed from the system. This can best be done by providing the reaction vessel with a fractional distillation column and by carrying the reaction out at the reflux temperature of the reactant mixture. In this way the alcohol may be removed overhead continuously, or intermittently, as desired. Alternatively, the reaction may be initially carried out below the reflux temperature and then heated to the reflux temperature when it is desired to remove the alcohol and to accelerate the reaction. As previously indicated, while the process described above makes it possible to produce significant quantities of carbamates from aromatic or aliphatic amines and aromatic or aliphatic carbonates, there are also formed varying quantities of corresponding substituted ureas. At the same time N-substituted amines are produced in varying quantities. It has been found that there are some variations among the various Lewis acids which are employed in accordance with this invention with respect to the ratio of carbamates to substituted ureas and N-substituted amine produced by their use and the uranium and uranyl salts have been found to be particularly advantageous from the standpoint of favorable ratios of carbamates to byproducts. In addition, I have found that excess amine favors the formation of substituted ureas, whereas excess ester tends to supress such by-product formation.

The following specific examples of practical application will serve to provide a fuller appreciation of the invention, but it is to be understood that these examples are given by way of illustration only and are not to be construed as limitative of the invention.

EXAMPLE I

Into a 500 ml. flask fitted to a 20 plate Oldershaw distillation column, is charged 180 g. (2 M) dimethyl carbonate, 37.2 g. (0.4 M) aniline and 11.4 g. (0.5 M) antimony trichloride. The solution is refluxed through the column and when sufficient alcohol has formed to drop the head temperature to 85° C. a mixture of dimethyl carbonate and methanol is removed overhead. After six hours during which the pot temperature remains at approximately 100° C., the reaction is stopped, the reaction solution cooled and 13.3 g. solid diphenyl urea removed by filtration. Over 56% of the aniline has reacted and when the filtrate is analyzed it is found to consist primarily of methyl N-phenyl carbamate along with a small amount of N-methyl aniline. The filtrate is readily separated into its components by fractional distillation to remove unreacted dimethyl carbonate and aniline, as well as by-product N-methyl aniline. The residue is recrystallized from hexane which is filtered hot to yield the pure methyl N-phenyl carbamate, the carbamate to substituted aniline ratio is about 5 to 1.

EXAMPLE II

Following the procedure and using the apparatus described in Example I, the flask is charged with 180 g. dimethyl carbonate, 37.2 g. aniline and 5.02 g. uranyl nitrate. The solution is refluxed and when the head temperature drops to 78° C. a mixture of dimethyl carbonate and methanol in a total amount of 68.1 g. is removed. After 1.25 hours, during which the pot temperature remains at about 100° C., the reaction is stopped and solid diphenyl urea (1.2 g.) is removed by filtration. Analysis of the product shows 11.83 g. methyl N-phenyl carbamate and 6.3 g. N-methyl aniline.

EXAMPLE III

Again following the procedure of Example I, 1.46 parts by weight of N-butyl amine are reacted with 1.80 parts by weight of dimethyl carbonate at approximately 80° C. for 31.5 hours, using 0.25 part by weight of uranyl nitrate as catalyst. The product is found to contain 2.53 parts methyl N-butyl carbamate and minor amounts of by-products.

EXAMPLE IV

When the general procedure of Example I is repeated, using hexamethylene diamine in place of aniline, the product carbamate is di-methoxyl carbonyl hexamethylene diamine,

CH₃OOCNHCH₂CH₂CH₂CH₂CH₂CH₂NHCOOCH₃

EXAMPLE V

When 4.28 g. of diphenyl carbonate are reacted with 1.86 g. of aniline in the presence of .001 mol of antimony trichloride at 80°, 36% of the diphenyl carbonate reacts in 3.5 hours. When the antimony trichloride is replaced by .0005 mol of uranyl nitrate, 29% of the diphenyl carbonate reacts in the same time. The product carbamate in each case is phenyl N-phenyl carbamate. When the reaction is repeated at the same temperature with no catalyst present, only 8% of the diphenyl carbonate reacts in 3.5 hours.

EXAMPLE VI

When the general procedure of Example II is repeated, using 0.05 mol of uranyl nitrate, and 0.4 mol of aniline, but using diethyl carbonate (2 mols) in place of dimethyl carbonate, and carrying the reaction out at 85° C. for 1 hour, the product carbamate is ethyl N-phenyl carbamate.

EXAMPLE VII

When the general procedure of Example I is followed, except the aniline is replaced with 2,4-toluene diamine, the product is di-methoxy carbonyl-2,4-toluene diamine

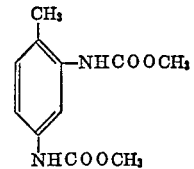

along with by-products consisting of monomethoxy-carbonyl-2,4-toluene diamine and N-methylated diamines.

EXAMPLE VIII

Following the general procedure of Example II, 37.2 g. aniline and 180 g. dimethyl carbonate are reacted with 0.01 mol uranyl chloride. Reaction is carried out at 101° C. for 3 hours. There are produced 21.9 g. methyl N-phenyl carbamate, 3.9 N-methyl aniline and 1.1 g. diphenyl urea.

EXAMPLE IX

The procedure of Example VIII is repeated except that the reaction is carried out at 96° C. for 12.7 hours. There are produced 20.4 g. methyl N-phenyl carbamate, 4.6 g. N-methyl aniline and 1.6 g. diphenyl urea.

EXAMPLE X

Again following the general procedure for Example II, 510 g. aniline and 535 g. dimethyl carbonate are reacted with 56 g. UCl₄ for 28.4 hours at 80° C. The product includes 248 g. methyl N-phenyl carbamate, 15.6 g. N-methyl aniline and a small amount of diphenyl urea.

EXAMPLE XI

When the procedure of Example I is followed but using cyclohexylamine instead of aniline, the carbamate product is methyl N-cyclohexyl carbamate.

EXAMPLE XII

In like manner, when 1-aminonaphthalene is substituted for aniline in the general procedure of Example I, the carbamate product is methyl N-naphthyl carbamate.

EXAMPLE XIII

When the procedure of Example I is repeated, using 3-chloroaniline instead of unsubstituted aniline, the carbamate product is methyl N-(m-chloro phenyl) carbamate.

EXAMPLE XIV

The action of uranyl acetate as a catalyst is shown by reacting 510 g. aniline and 535 g. dimethyl carbonate at 80° C. for 26.75 hours in the presence of 20 g. uranyl acetate. The ratio of the product methyl N-phenyl carbamate to the by-product substituted aniline is 3.0 to 1.

In order to evaluate the relative performance of individual Lewis acids, equal volumes of dimethyl carbonate and aniline are heated in sealed tubes at 80° C. for various periods of time. The product in each case comprises N-phenyl methyl carbamate and N-methyl aniline. In the following table, which gives pertinent data regarding these experiments, the selectivity of the reaction in favor of the carbamate is shown by the indicated weight ratio of carbamate to substituted aniline.

| Lewis acid | Catalyst, mole | Aniline, mole | DMC, mole | Temp., °C. | Time, hrs. | Ratio |
|---|---|---|---|---|---|---|
| $SbCl_2$ | 0.044 | 1 | 1 | 80 | 18 | 4.8:1 |
| $SbCl_3$ | 0.022 | 1 | 1 | 80 | 24 | 4.5:1 |
| $UO_2(NO_3)_2$ | 0.015 | 1 | 1 | 80 | 23.5 | 4.0:1 |
| $AlCl_3$ | 0.075 | 1 | 1 | 80 | 18 | 2.7:1 |
| $SbF_3$ | 0.028 | 1 | 1 | 80 | 24 | 2.5:1 |
| $FeCl_3$ | 0.062 | 1 | 1 | 80 | 18 | 2.2:1 |
| $SbCl_5$ | 0.033 | 1 | 1 | 80 | 18 | 2.1:1 |
| $NbCl_5$ | 0.036 | 1 | 1 | 80 | 23.5 | 1.95:1 |
| $UO_2$ | 0.028 | 1 | 1 | 80 | 24.8 | 6:1 |
| $UO_3$ | 0.028 | 1 | 1 | 80 | 25.2 | 9:1 |
| $ThCl_4$ | 0.028 | 1 | 1 | 80 | 21.9 | 1.5:1 |

When the reaction between dimethyl carbonate and aniline in a 1:1 mol ratio is attempted at 80° C., in the absence of a Lewis acid, no carbamate and no substituted aniline are produced even after 240 hours. When excess dimethyl carbonate is used, corresponding negative results are obtained. When the temperature is raised to 150° C. only trace amounts of these compounds are obtained even after several hours.

What is claimed is:

1. A process for producing an N-substituted carbamate which comprises reacting alkyl, aryl or alkyl aryl esters of carbonic acid with a primary or secondary amine at about 20° to about 250° C. in the presence of a Lewis acid catalyst.

2. A process as defined in claim 1, wherein said carbonate is an alkyl carbonate.

3. A process as defined in claim 1, wherein said amine is an aryl amine.

4. A process as defined in claim 1, wherein said catalyst is a uranium compound.

5. A process as defined in claim 1, wherein said carbonate is an alkyl carbonate, said amine is an aryl amine, and said ctalyst is a uranium compound.

6. A process as defined in claim 1, wherein said carbonate is used in an amount which is in excess in relation to the stiochiometric quantity with respect to the amine.

7. A process as defined in claim 1, wherein the reaction is carried out at substantially atmospheric pressure at a temperature of up to about 150° C.

8. A process as defined in claim 1, wherein the alcohol liberated is removed during the course of the reaction.

References Cited

Chemical Reviews, vol. 65 (1965), No. 5, p. 571, relied on (QD 1A 563).

LORRAINE A. WEINBERGER, Primary Examiner

L. THAXTON, Assistant Examiner

U.S. Cl. X.R.

260—247,2 B, 286 C, 293.88, 468 E, 481 C, 482 C, 482 B, 479 C